United States Patent Office 3,374,247
Patented Mar. 19, 1968

3,374,247
PROCESS FOR THE CATALYZED REDISTRIBUTION OF SILICON-FLUORINE AND SILICON-HYDROCARBYLOXY BONDS
Enrico J. Pepe, Kenmore, and Bernard Kanner, Tonawanda, N.Y., assignors to Union Carbide Corporation, a corporation of New York
No Drawing. Filed Oct. 3, 1963, Ser. No. 313,442
7 Claims. (Cl. 260—348)

ABSTRACT OF THE DISCLOSURE

This invention is directed to a catalytic process for the redistribution of silicone-fluorine and silicon-hydrocarbyloxy bonds by heating a mixture of compounds containing at least one silicon-fluorine bond and at least one silicon-hydrocarbyloxy bond in the presence of a redistribution catalyst.

---

This invention relates to a process for redistribution of moieties bonded to silicon atoms. More particularly the invention is directed to a process for the redistribution of silicon-fluorine bonds and silicon-hydrocarbyloxy bonds in organosilicon compounds.

It has now been discovered that an efficient and rapid redistribution of silicon-fluorine bonds and silicon-hydrocarbyloxy bonds takes place at moderate temperatures when an organosilicon compound (or mixture of organosilicon compounds) and a redistribution catalyst are maintained at a temperature sufficiently elevated to cause bond redistribution. For example, when phenyltrifluorosilane, methyltriethoxysilane and tetrabutyl titanate catalyst are mixed together at room temperature, bond redistribution takes place with the production of an equilibrium mixture of products as shown by the following equation (not balanced):

(A) $\phi SiF_3 + MeSi(OEt)_3 \rightarrow \phi Si(OEt)_3 + \phi SiF(OEt)_2$
   $+ \phi SiF_2(OEt) + MeSiF(OEt)_2$
   $+ MeSiF_2(OEt) + MeSiF_3$ As used herein, $\phi$ represents the phenyl group, $C_6H_5$; Me represents the methyl group, $CH_3$; and Et represents the ethyl group, $C_2H_5$.

It is, therefore, an object of this invention to provide a process for the redistribution of silicon-fluorine bonds and silicon-hydrocarbyloxy bonds in organosilicon compounds. A further object of the invention is to provide an efficient process for the production of a wide variety of fluorosilanes, hydrocarbyloxy silanes and mixed fluorohydrocarbyloxy silanes. These and other objects of the invention will be apparent from the following description and appended claims.

The process of this invention comprises mixing together (a) one or more organosilicon compounds wherein at least one such compound contains a silicon-carbon bond (provided that in such organosilicon compound or organosilicon compounds there is at least one silicon-bonded fluorine atom and at least one silicon-bonded hydrocarbyloxy group) and (b) a redistribution catalyst and maintaining the mixture at a temperature sufficiently elevated to cause redistribution of the silicon-fluorine and silicon-hydrocarbyloxy bonds. The mixture of redistributed products contains at least one silicon atom on which all fluorine atoms originally bonded thereto have been replaced by hydrocarbyloxy groups.

Monomeric silanes which can be employed in the process of this invention can be presented by the formula:

(B) 

wherein R is a divalent organic group; Y is hydrogen or functional substituent group, preferably fluoro, chloro, bromo, iodo, cyano,

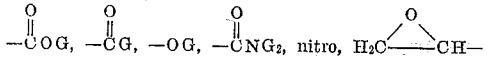

—NR''$_2$ or —NHC$_d$H$_{2d}$NR''$_2$; G is a monovalent hydrocarbon group; R' is hydrogen, the vinyl group or a Y—R— group; X is fluorine or a hydrocarbyloxy group —OG; R'' is hydrogen, a G group or C$_d$H$_{2d}$OH; $b$ is an integer having a value from zero to 3; $c$ is an integer having a value from zero to 1; the sum of $b$ and $c$ is never greater than 3; and $d$ is an integer having a value from 1 to about 6; provided that (a) any nitrogen atom in a Y group is separated from silicon by at least three carbon atoms or an —R— group, (b) when more than two X groups are fluorine, the nitrogen atom of any $$\begin{array}{c} H \\ | \\ -N- \end{array}$$

moiety in a Y group is bonded to a carbon atom of a six membered fused or unfused aromatic ring system (that is, the $$\begin{array}{c} H \\ | \\ -N- \end{array}$$

moiety is bonded to an aromatic ring carbon atom contained in an R group, an R'' group or both such groups) and (c) when more than two X groups are fluorine, Y is not

The functional group Y can also be —SG,

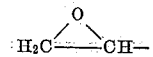

and the like, and, where not more than two X groups are fluorine, Y can be

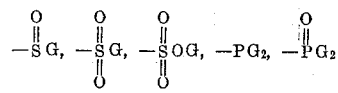

and the like.

The divalent organic group R is preferably a hydrocarbon group containing between 1 and about 17 carbon atoms. R can be, for example, an alkylene group such as methylene, ethylene, butylene(1,4), hexylene(1,2) 2-ethylhexylene-(1,6), and the like, a cycloalkylene group such as cyclopentylene-(1,3), cyclohexylene(1,4), 3-octylcyclohexylene(1,4) and the like and an arylene or alkarylene group such as phenylene(1,4), naphthalene(1,4), 2-ethylphenylene(1,4), —CH$_2$C$_6$H$_4$—,

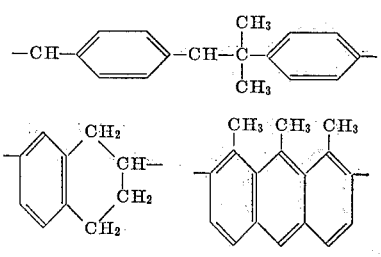

and the like, or an unsaturated group such as

—CH=CHCH$_2$—

—CH₂CH=CHCH₂—, and the like. R can also be a heterocyclic organic group such as

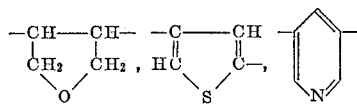

and the like.

The monovalent hydrocarbon group G is preferably one free of aliphatic unsaturation and containing from one to about 10 carbon atoms, for example, an alkyl, cycloalkyl, aryl or alkaryl group such as methyl, ethyl, isobutyl, hexyl, 2-ethylhexyl, cyclopentyl, 2-ethylcyclohexyl, phenyl, tolyl, mesityl, cumyl, naphthyl, and the like.

Illustrative compounds of formula B which can be used in the process of this invention are tetra-ethylsilicate,
methyltriethoxysilane,
dimethyldiethoxysilane,
trimethylethoxysilane,
tetra-methylsilicate,
dimethyldimethoxysilane,
phenyltriethoxysilane,
dimethyldibutoxysilane,
diphenyldiethoxysilane,
phenylmethyldiphenoxysilane,
vinylmethyldiethoxysilane,
nitrophenylmethyltriethoxysilane,
beta-cyanoethyltriethoxysilane,
phenyldifluoroethoxysilane,
methyldifluorohexoxysilane,
difluorodiethoxysilane,
gamma-cyanopropylcyclohexyldiethoxysilane,
methoxyphenyltriethoxysilane,
beta-cyanopropylphenyldimethoxysilane,
phenyltrifluorosilane,
diphenyldifluorosilane,
nitrophenyltrifluorosilane,
bis-nitrophenyldifluorosilane,
nitrophenylcyclopropyldifluorosilane,
cyanophenyltrifluorosilane,
methoxyphenylhexyldifluorosilane,
beta-cyanoethyltrifluorosilane,
gamma-cyanopropylmethyldifluorosilane,
vinylmethyldifluorosilane,
vinylphenyldifluorosilane,
allylmethyldifluorosilane,
p-aminophenylmethyldifluorosilane,
N-(beta-hydroxyethyl-beta-aminoethyl)-gamma-
    aminoisobutylmethyldifluorosilane,
gamma-glycidoxypropylmethyldiethoxysilane,
delta-sulfhydrylbutylmethyldifluorosilane,
p-(ethylsulfonyl)-phenylmethyldiethoxysilane,
gamma-diethylphosphonopropyltriethoxysilane,
beta-carbethoxyethyldifluorosilane,
delta-nitrobutylmethyldifluorosilane,
4-trifluorosilyl-N,N-dimethylbenzamide,
delta-bromobutyltripropoxysilane,
methoxyphenyltrifluorosilane,
silicon tetrafluoride,
cyclohexylvinyldiethoxysilane,
beta-cyanoethyltrifluorosilane,
gamma-chloroisobutyltrifluorosilane,
gamma-(N-methyl-N-phenyl-amino)propyltrifluorosilane,
beta-phenoxyethylmethyldiphenoxysilane,
nitronaphthylmethyldifluorosilane,
beta-phenylethyltrifluorosilane, and the like.

Linear and cyclic organo polysiloxanes can also be used in the process of this invention. Typical linear and cyclic polysiloxanes useful in this invention are those containing one or more units represented by the formula (C)  

and two or more units represented by the formula (D)  

wherein X, Y and R have the meanings defined with reference to formula B above.

Illustrative linear polysiloxanes useful in this invention include 1,5 - difluorotetramethyldisiloxane, 1,7-diethoxyhexamethyltrisiloxane, 1,9 - difluorononamethyltetrasiloxane, 1-fluoro-7-methoxyhexamethyltrisiloxane and the like. Illustrative cyclic polysiloxanes useful in this invention include pentamethylfluorocyclotrisiloxane, heptaethylethoxycyclotetrasiloxane, hexamethyldifluorocyclotetrasiloxane, tetramethyldiethoxycyclotrisiloxane, ethoxytrimethyl - bisnitrophenylcyclotrisiloxane, fluorohexamethyl - 2 - cyanoethylcyclotetrasiloxane, and the like.

The redistribution process of this invention applies to one or more silanes, linear polysiloxanes, cyclic polysiloxanes, or mixtures thereof provided that in such mixture there is at least one fluorine atom bonded to a silicon atom and at least one hydrocarbyloxy group bonded to a silicon atom.

The organosilicon compounds of formula B hereinabove can be prepared as follows:

(a) Compounds of formula B in which all of the X moieties are hydrocarbyloxy groups can be prepared by methods well known and understood by those skilled in organosilicon chemistry.

(b) Compounds of formula B wherein all of the X moieties are fluorine atoms and wherein the Y groups are free from active hydrogen atoms or epoxy groups can be prepared by any of several methods set forth in French Patent No. 1,303,018 published July 30, 1962 and British Patent No. 912,448, published Dec. 5, 1962.

(c) Compounds of formula B wherein Y is —NH₂ can be prepared by the reaction of the otherwise identical compound of formula B wherein the Y group is the cyano group with hydrogen in the presence of a nickel hydrogenation catalyst. For example, gamma-aminopropylmethyldifluorosilane can be prepared by the reaction of beta-cyanoethylmethyldifluorosilane with hydrogen under pressure in the presence of Raney nickel catalyst. This type of reaction is also described in British Patent No. 882,096 published November 8, 1961.

(d) Compounds of formula B wherein the Y group is

(one or both R″ groups not hydrogen) or —NHC_dH_{2d}R″₂ can be prepared by the reaction of the otherwise identical compound of formula B wherein Y is chlorine, bromine or iodine with a primary or secondary amine, diamine or hydroxy-substituted amine. For example, N-ethyl-gamma-aminopropylmethyldifluorosilane can be prepared by the reaction of gamma-chloropropylmethyldifluorosilane with ethylamine. This type of reaction is also described in U.S. Patent No. 3,033,815 and French Patent No. 1,297,045.

(e) Compounds of formula B wherein the Y group is the epoxy group

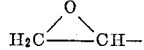

can be prepared by the reaction of an olefinically unsaturated epoxy compound with a fluorosilane containing a silicon hydrogen bond in the presence of a platinum catalyst. For example, gamma-glycidoxypropylmethyldifluorosilane can be prepared by the reaction of allylglycidyl ether with methyldifluorosilane in the presence of platinum on gamma-alumina as a catalyst. This type of reaction is also described in U.S. Patent No. 2,946,701.

(f) Compounds of formula B containing both silicon-bonded fluorine atoms and silicon-bonded hydrocargyloxy groups can be prepared by the reaction of an alcohol GOH, wherein G has the meaning defined hereinabove, with a mixed chlorofluorosilane. The mixed chlorofluorosilane can be prepared by the methods of French Patent No. 1,303,018. Controlled amounts of alcohol (one mole of alcohol per mole of silicon-chlorine bond) will then react selectively with the silicon-chlorine bonds to give a compound containing both silicon-bonded fluorine atoms and silicon-bonded hydrocarbyloxy groups. For example, gamma-chloropropylmethylfluoroethoxysilane can be prepared by the reaction of gamma-chloropropylmethylfluorochlorosilane with ethanol in a one-to-one mole ratio, and beta-cyanoethylmethylfluoromethoxysilane can be prepared by the reaction of beta-cyanoethylmethylfluorochlorosilane with methanol in a one-to-one mole ratio.

The linear and cyclic polysiloxanes containing units of formulas C and D can be prepared by conventional methods such as hydrolysis and condensation of silanes of formula B.

The redistribution catalysts that can be employed in the process of this invention are represented by the formula (E)  $MZ_n$ wherein M is aluminum, boron, iron, tin, zirconium or titanium; Z is a halogen or an —OG group; G has the meaning defined with reference to Formula A hereinabove; and $n$ is an integer equal to the valence of M. The halogens represented by Z include fluorine, chlorine, bromine and iodine. Preferably Z is halogen or a hydrocarbyloxy group containing from 1 to about 10 carbon atoms.

Illustrative compounds of formula E include boron triethoxide, aluminum tri-isopropoxide, aluminum tributoxide, titanium tetrabutoxide, zirconium, tetraethoxde, aluminum trichloride, boron tribromide, aluminum triiodide, tin dichloride, titanium tetrachloride, iron tribromide, aluminum trifluoride, aluminum dichlorobromide, titanium trichloroethoxide, aluminum diethoxide hexoxide, titanium dibutoxide-diphenoxide, and the like.

Two preferred classes of catalysts are those represented by the formulas (F)  $AlZ'_3$ wherein Z' is a hologen, namely fluorine, chlorine, bromine or iodine and (G)  $TiZ''_4$ wherein Z'' is an alkoxy group containing from 1 to about 6 carbon atoms. For example, Z'' can be methoxy, ethoxy, isobutoxy, hexoxy, and the like.

The amount of redistribution catalyst employed in the process of this invention can vary from as little as 0.005 percent by weight of the total reaction mixture to 25 percent by weight or greater. A preferred amount of catalyst is about 0.01 to 5 weight percent. There is generally no advantage in using more than 5 weight percent catalyst.

The redistribution catalysts of this invention can be formed in situ by adding one or more of the metals M or oxides of these metals (preferably in finely divided form) directly to the mixture of organosilicon compounds. The metal or metal oxide will react with some of the silicon-fluorine bonds and/or silicon-hydrocarbyloxy bonds in the mixture to form a catalyst of formula E.

The redistribution reaction of this invention can be carried out with or without the use of a solvent. In general, the use of a solvent is not required. However, inert liquid organic solvents can be used if desired and are often advantageous where two or more reactants are mutually soluble in the solvent but not soluble in one other. The term "inert," as used herein, means that the solvent does not react with silicon-fluorine bonds, silicon-hydrocarbyloxy bonds or with the various functional groups on the organic portions of the organosilicon compounds. Examples of inert liquid organic solvents which can be used in the process of this invention are aromatic hydrocarbons, such as benzene, toluene, xylene, cumene, and tetrahydronaphthalene, aliphatic hydrocarbons such as heptane, octane and petroleum ether and ethers such as diethyl ether, dibutyl ether, dioxane, tetrahydrofuran, ethylene glycol dimethyl ether and diethylene glycol dimethyl ether, and the like.

The temperature at which the process of this invention takes place is not critical so long as the temperature is sufficiently elevated to cause redistribution of the silicon-fluorine and silicon-hydrocarbyloxy bonds. A preferred temperature range is from about −10° C. to about 275° C. with a range from 20° C. to about 200° C. being most preferred.

The time necessary to effect redistribution of silicon-fluorine and silicon-hydrocarbyloxy bonds by the process of this invention is likewise not critical. The exact time required to form an equilibrium mixture of redistributed products varies, of course, with the temperature and the nature of the organosilicon compounds. In general, an equilibrium mixture of redistributed products is formed in about 1 to 5 hours. The equilibrium mixture contains detectable and isolatable quantities of compounds wherein all fluorine atoms originally bonded to a silicon atom have been replaced by hydrocarbyloxy groups.

Pressure is also not a critical factor in the process of this invention. The most convenient pressure for carrying out the process is normal atmospheric pressure. However, the reaction can be carried out under pressure if desired, and it is frequently advantageous to use sub-atmospheic temperature pressures in order to remove relatively more volatile products from the reaction mixture.

The redistribution process of the present invention does not require the presence of two different organosilicon compounds. A single compound is sufficient as long as it contains at least one silicon bonded fluorine atom and at least one silicon-bonded hydrocarbyloxy group. For example, when phenyldifluoroethoxysilane and aluminum trichloride are heated at about 150° C., an equilibrium mixture of phenyltriethoxysilane, phenylfluorodiethoxysilane, phenyldifluoroethoxysilane and phenyltrifluorosilane is formed.

As used herein the terms "fluorosilane" and "hydrocarbyloxy silane" refer to compounds containing silicon-fluorine bonds and silicon-hydrocarbyloxy bonds regardless of the functional groups present in the organic portion of the molecule. Thus, gamma-fluoropropyltriethoxysilane is a hydrocarbyloxysilane and gamma-methoxypropyltrifluorosilane is a fluorosilane.

The redistribution reaction of the present invention can be driven to completion, thus providing an efficient method for the production of a wide variety of organosilicon compounds containing silicon-fluorine bonds, siliconhydrocarbyloxy bonds or both such bonds. In general, the redistribution reaction of the invention can be driven to completion by using a stoichiometric excess of one of the reactants or by removing one or more of the more volatile products from the reaction mixture.

The particular methods by which the redistribution reaction of this invention is driven to completion and the particular methods by which the products of the redistribution reaction are separated and isolated depend, therefore, on the nature of the individual reaction mixture, and the appropriate procedures in each instance will be readily apparent to those skilled in organosilicon chemistry. For example, in the reaction depicted in Equation A hereinabove, the use of a stoichiometric excess of $MeSi(OEt)_3$ and the removal from the reaction mixture of the relatively more volatile products results in substantially complete conversion of $\phi SiF_3$ to $\phi Si(OEt)_3$. Several additional illustrative procedures are set forth in the examples hereinbelow.

The compounds produced by the redistribution process of this invention have a variety of uses well known and understood by those skilled in organosilicon chemistry. The silanes of formula B and siloxanes containing units of formulas C and D, wherein all X groups are hydrocarbyloxy groups, have a variety of uses which have been described in the technical and patent literature. Silanes of formula B and siloxanes containing units of formulas C and D wherein some or all of the X groups are fluorine have the same useful properties as the corresponding hydrocarbyloxy silicon compounds. In addition, silanes of formula B, wherein some or all of the X groups are fluorine, can be hydrolyzed by conventional procedures to yield organo functional polysiloxanes which do not contain silicon bonded fluorine atoms. and the uses of such organo functional polysiloxanes are well known and understood.

The following illustrative examples are presented. In the examples, "B.P." represents boiling point (at one atmosphere pressure unless otherwise indicated), "$n_D^{25}$" represents refractive index at 25° C. with reference to the sodium "D" line, "mm. Hg" is the pressure in millimeters of mercury, and NE represents neutralization equivalent.

*Example 1*

Into a 200 ml. distillation flask fitted to a 18" packed distillation column was charged 50 g. (0.24 mole) of tetra ethylsilicate, 50 g. (0.27 mole) of $\phi$MeSiF(OEt) are 0.5 g. (0.5 wt.-percent) of anhydrous aluminum chloride. The mixture was heated at its boiling point and distilled into the following cuts over a period of 2 hours:

(A) 12.5 g. of $F_2Si(OEt)_2$, B.P. 82–84° C./750 mm. Hg
(B) 19.0 g. of $FSi(OEt)_3$, B.P. 134–135° C./750 mm. Hg
(C) 18.0 g. of recovered $Si(OEt)_4$, B.P. 166° C./750 mm. Hg
(D) 35.0 g. of $\phi$MeSi(OEt)$_2$, B.P. 219–220° C./750 mm. Hg, $n_D^{25}=1.4685$.

*Example 2*

Following the procedures of Example 1, a mixture comprising 50 g. (0.31 mole) of $\phi$SiMeF$_2$, 125 g. (0.6 mole) of Si(OEt)$_4$ and 0.88 g. (0.5 wt.-percent) of AlCl$_3$ was heated at its boiling point and fractionally distilled to give 63 g. (0.3 mole) of $\phi$MeSi(OEt)$_2$ (96 mole-percent yield, based on $\phi$SiMeF$_2$).

*Example 3*

Into a 100 ml. distillation flask fitted to a 12" Vigreaux column was charged 20.7 g. (0.1 mole) of para-nitrophenylmethyldifluorosilane, NO$_2\phi$SiMeF$_2$, 42 g. (0.2 mole) of Si(OEt)$_4$ and 0.3 g. (0.5 wt.-percent) of AlCl$_3$. The mixture was heated at its boiling point and relatively low boiling (82–160° C.) products were removed at the head over a period of 1 hour. Fractional distillation of the residue gave 22 g. (0.84 mole, 84 mole-percent yield) of para-nitrophenylmethyldiethoxysilane, NO$_2\phi$SiMe(OEt)$_2$:

B.P. 100°/0.08 mm. Hg; $n_D^{25}=1.4922$; less than 0.4 weight-percent F.

*Example 4*

Into a 200 ml. distillation flask fitted to a 12" packed distillation column was charged 40 g. (0.25 mole) of $\phi$SiF$_3$, 90 g. (0.5 mole) of MeSi(OEt)$_3$ and 0.65 g. (0.5 wt.-percent) of AlCl$_3$. The mixture was heated at its boiling point and fractionally distilled over a period of 2 hours. The following cuts were obtained:

(a) 38 g. 42–50° C./760 mm. consisting of MeSiF$_x$(OEt)$_y$, $x+y=3$.
(b) 23 g. of recovered MeSi(OEt)$_3$
(c) 42 g. of $\phi$Si(OEt)$_3$: B.P. 232–233° C.; $n_D^{25}=1.4658$; less than 0.4 weight-percent F.

*Example 5*

Into a 250 ml. distillation flask fitted to a 18" Vigreaux column was charged 40.5 g. (0.25 mole) of $\phi$SiF$_3$, 177 g. (1.5 moles) of Me$_3$SiOEt and 1 g. (0.5 wt.-percent) of AlCl$_3$. On heating the mixture at its boiling point 64 g. (95% of theory) gaseous Me$_3$SiF was condensed in a cold trap. Fractional distillation then gave unreacted Me$_3$SiOEt and 56.5 g. (0.235 mole, 94 mole-percent yield) of $\phi$Si(OEt)$_3$: B.P. 232–233° C.; $n_D^{25}=1.4679$; less than 0.4 weight-percent F.

*Example 6*

Into a 200 ml. distillation flask fitted to a 12" packed distillation column was charged 54 g. (0.33 mole) of phenyltrifluorosilane, 53.4 g. (0.33 mole) of methylvinyldiethoxysilane and 0.5 g. (0.5 weight-percent) of tetrabutyltitanate. The reaction mixture was heated to about 200° C. over a one hour period and 34 grams of methylvinyldifluorosilane was collected by fractional distillation: B.P. 26–28° C./750 mm. Hg; $n_D^{25}=1.3137$; 91.7% free of residual ethoxy; hydrolyzable F—32.3% (35.1% calc.).

*Example 7*

In a 200 ml. round-bottom flask fitted to a 14-inch Vigreaux column was placed 16 g. (0.07 mole) of aminophenylmethyldiethoxysilane and 35 g. of 1,3,5-tri(beta-difluoromethylsilylethyl)benzene [prepared by the reaction of sodium fluorosilicate with 1,3,5-C$_6$H$_3$ $(CH_2CH_2SiMeCl_2)_3$]

and 1 ml. of tetrabutyltitanate as catalyst. The reaction mixture was heated to its boiling point and fractionally distilled.

| Fraction | Boiling Point, ° C./mm. Hg | Weight Collected (grams) | $n_D^{25}$ | NE |
|---|---|---|---|---|
| 1 | 115–116/15 | 6.5 | 1.4987 | 168 |
| 2 | 161–121/15 | 4.2 | 1.4980 | 177 |
| 3 | Residue | 38 | | |

Cuts 1 and 2 represent a 70% yield of aminophenylmethyldifluorosilane (theoretical NE–173).

*Example 8*

In a 500 ml. round-bottom flask fitted to an 18-inch packed column was placed 77 g. (0.5 mole) of delta-aminobutylmethyldifluorosilane, 148 g. (1.0 mole) of dimethyldiethoxysilane and 0.5 grams of aluminum chloride catalyst. The reaction mixture was heated to its boiling point and fractionally distilled.

| Fraction | Boiling Point, ° C./mm. Hg | Weight Collected (grams) | $n_D^{25}$ | NE |
|---|---|---|---|---|
| 1 | 67–90/26 | 5.5 | | |
| 2 | 90–94/26 | 6.0 | 1.4172 | |
| 3 | 94/26 | 12 | 1.4156 | 185 |
| 4 | 94–113/26 | 10 | 1.4229 | |
| 5 | 113/26 | 17.5 | 1.4274 | 206 |
| 6 | 83–113/3–13 | 40.5 | 1.4277 | |

Cuts 5 and 6 represent a 56% yield of delta-aminobutylmethyldiethoxysilane and cuts 2 and 3 represent a 31% yield of delta-aminobutylmethylfluoroethoxysilane.

*Example 9*

Into a 500 ml. distillation flask was charged 100 g. of gamma-glycidoxypropylmethyldifluorosilane,

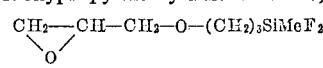

(about 0.5 moles), 296 g. (2 moles) of Me$_2$Si(OEt)$_2$ and 2 g. of tetra-butyltitanate. The flask was attached to a three-foot packed column (20 plates) and the reaction mixture heated at its boiling point for 2½ hours with the pot temperature rising from 50 to 113° C. as low boiling dimethylfluorosilanes were removed. After removal of excess dimethyldiethoxysilane, fractional distillation gave gamma-glycidoxypropylmethyldiethoxysilane: B.P. 90°/0.35 mm.; $n_D^{25}=1.4305$; NE–248 (248 calc.).

What is claimed is:

1. A process for the redistribution of silicon-fluorine bonds and silicon-alkoxy bonds, all fluorine atoms on at least one silicon atom being replaced by alkoxy groups, which comprises (1) mixing together (a) at least one organo-silicon compound represented by the formula

wherein R is a radical containing from 1 to about 17 carbon atoms selected from the group consisting of alkyl, phenyl, para-nitrophenyl, para-aminophenyl, aminoalkyl wherein the amino group is separated from the silicon by at least three carbon atoms, and

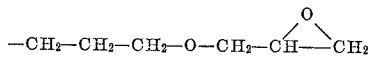

wherein R' is an alkyl radical of from 1 to 17 carbon atoms; wherein $b$ is an integer having a value from zero to 3; wherein $c$ is an integer having a value from 0 to 1, and the sum of $b$ and $c$ is never greater than 3; wherein X is selected from the class consisting of fluorine and alkoxy groups; provided that when more than two X groups are fluorine, R is not an

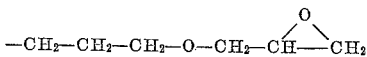

radical, and wherein there is at least one silicon-carbon bond, at least one silicon atom has at least one fluorine atom bonded thereto, and at least one silicon atom has at least one alkoxy group bonded thereto; and (b) a redistribution catalyst selected from the group consisting of $AlCl_3$ and Ti-(O-alkyl of from 1–10 carbon atoms)$_4$ and (2) maintaining at a temperature sufficiently elevated to cause redistribution of said silicon-alkoxy bonds and silicon-fluorine bonds, and within the range of from about $-10°$ C. to about $+275°$ C.

2. A process as defined in claim 1, wherein said mixture of organosilicon compounds and redistribution catalyst is dissolved in an inert liquid organic solvent.

3. A process as defined in claim 1, wherein the redistribution catalyst is $AlCl_3$.

4. A process as defined in claim 1, wherein the redistribution catalyst is Ti-(O-alkyl of from 1–10 carbon atoms)$_4$.

5. The process which comprises forming a mixture of p-nitrophenylmethyldifluorosilane, tetraethylsilicate, and aluminum chloride, heating said mixture at its boiling point to cause redistribution of the silicon-fluorine and silicon-ethoxy bonds in said mixture, and separating p-nitrophenylmethyldiethoxysilane from the redistributed mixture.

6. The process which comprises forming a mixture of delta-aminobutylmethyldifluorosilane, dimethyldiethoxysilane, and aluminum chloride, heating said mixture at its boiling point to cause redistribution of the silicon-fluorine and silicon-ethoxy bonds in said mixture, and separating delta-aminobutylmethyldiethoxysilane from the redistributed mixture.

7. The process which comprises forming a mixture of gamma-glycidoxypropylmethyldifluorosilane, dimethyldiethoxysilane, and tetrabutyltitanate, heating and mixture at its boiling point to cause redistribution of the silicon-fluorine and silicon-ethoxy bonds in said mixture, and separating gamma-glycidoxypropylmethyldiethoxysilane from the redistributed mixture.

References Cited

UNITED STATES PATENTS

| | | | |
|---|---|---|---|
| 2,626,273 | 1/1953 | Hunter et al. | 260—448.8 |
| 2,732,281 | 1/1956 | Bailey et al. | 260—448.2 |
| 2,735,861 | 2/1956 | Erickson et al. | 260—448.8 |
| 2,746,981 | 5/1956 | Wagner | 260—448.2 |
| 3,054,817 | 9/1962 | Pepe | 260—448.2 |
| 3,128,297 | 4/1964 | Kanner et al. | 260—448.2 |

OTHER REFERENCES

Jacovic, Milhailo: Chimie & Industrie, vol. 82, No. 5, November 1959, pages 687–689.

WALTER A. MODANCE, *Primary Examiner.*

N. S. MILESTONE, *Examiner.*